US012767023B2

(12) United States Patent
Kim et al.

(10) Patent No.: US 12,767,023 B2
(45) Date of Patent: Oct. 20, 2026

(54) INTEGRATED ADJUSTABLE NECK SUPPORT FOR A VEHICLE SEAT

(71) Applicant: GM GLOBAL TECHNOLOGY OPERATIONS LLC, Detroit, MI (US)

(72) Inventors: Jonghyun Kim, Bupyeong-gu (KR); Jongsuk An, Seo-gu (KR); Yongjin Choo, Dongjak-gu (KR); Minsu Lee, Gimpo (KR); Seokju Yong, Bucheon-si (KR)

(73) Assignee: GM Global Technology Operations LLC, Detroit, MI (US)

( * ) Notice: Subject to any disclaimer, the term of this patent is extended or adjusted under 35 U.S.C. 154(b) by 95 days.

(21) Appl. No.: 18/914,350

(22) Filed: Oct. 14, 2024

(65) Prior Publication Data

US 2026/0103133 A1 Apr. 16, 2026

(51) Int. Cl.
*B60N 2/865* (2018.01)
*B60N 2/809* (2018.01)

(52) U.S. Cl.
CPC ............. *B60N 2/865* (2018.02); *B60N 2/809* (2018.02)

(58) Field of Classification Search
CPC ........ B60N 2/976; B60N 2/806; B60N 2/809; B60N 2/838; B60N 2/856; B60N 2/865; B60N 2/879
See application file for complete search history.

(56) References Cited

U.S. PATENT DOCUMENTS

| | | | | |
|---|---|---|---|---|
| 7,410,218 B2 * | 8/2008 | Kotani | B60N 2/885 297/391 | |
| 8,950,815 B2 * | 2/2015 | Wang | B60N 2/815 297/391 | |
| 2002/0185573 A1 | 12/2002 | Bisch | | |

FOREIGN PATENT DOCUMENTS

| | | | | |
|---|---|---|---|---|
| CN | 101973221 A * | 2/2011 | B60N 2/809 | |
| DE | 102005030258 A1 * | 1/2007 | B60N 2/5685 | |
| DE | 102020104308 A1 * | 8/2021 | A61H 9/0078 | |
| KR | 1020110002542 A | 1/2011 | | |

* cited by examiner

*Primary Examiner* — Milton Nelson, Jr.
(74) *Attorney, Agent, or Firm* — Quinn IP Law

(57) ABSTRACT

A head restraint assembly for a vehicle seat having a seat cushion and backrest includes a headrest moveably mounted to the backrest and configured to limit rearward movement of a head relative to a torso of a vehicle seat occupant. The head restraint assembly also includes a neck support fixedly and integrally mounted to the headrest and configured to support a neck of the vehicle seat occupant and shift together with the headrest relative to the backrest.

16 Claims, 4 Drawing Sheets

INTEGRATED ADJUSTABLE NECK SUPPORT FOR A VEHICLE SEAT

INTRODUCTION

The present disclosure relates to an integrated adjustable neck support for a vehicle seat.

Vehicles are typically equipped with seats designed to accommodate the operator and passenger(s) inside the vehicle. Frequently, such seats are adjustable fore-aft relative to the vehicle structure, as well as being able to recline in order to enhance passenger comfort and be moved out of the way to generate useful space for transporting cargo.

Many modern vehicle seats are also provided with support features, such as headrests and thigh or side bolsters, adjustable or customizable to various body types and individual occupant's needs. Such adjustable support features may be provided to enhance the seated occupant's comfort and/or limit unwanted movement of the occupant relative to the seat, such as during sharp and/or sudden changes in vehicle direction or speed.

SUMMARY

A head restraint assembly for a vehicle seat having a seat cushion and backrest includes a headrest moveably mounted to the backrest and configured to limit rearward movement of a head relative to a torso of a vehicle seat occupant. The head restraint assembly also includes a neck support fixedly and integrally mounted to the headrest and configured to brace a neck of the vehicle seat occupant and shift together with the headrest relative to the backrest.

The headrest may be configured to moveably adjust toward/away and fore/aft relative to the backrest.

The neck support may include a center section mounted to the headrest. The neck support may also include a first arm rotatably mounted to the center section. The first arm provides an adjustment angle between an unfolded position and a folded position relative to the center section to support the vehicle seat occupant's neck in a first lateral direction.

The neck support may additionally include a second arm rotatably mounted to the center section. The second arm provides an adjustment angle between an unfolded position and a folded position relative to the center section to support the vehicle seat occupant's neck in a second lateral direction.

The first arm and the second arm may rotate independently relative to the center section.

The headrest may include a headrest frame. The neck support center section may be mounted to the headrest frame.

The head restraint assembly may additionally include a first hinge pin extending through each of the center section and the first arm and fixed to the first arm.

The head restraint assembly may further include a second hinge pin extending through each of the center section and the second arm and fixed to the second arm.

Each of the first and second hinge pins may be configured to generate friction relative to the center section and thereby affect adjustment of the respective first and second arms.

The neck support may include a mechanism configured to generate a massage of the vehicle seat occupant's neck.

The mechanism may include at least one electronically controlled fluid bladder configured to generate a pulsating motion relative to the vehicle seat occupant's neck.

The fluid bladder(s) may include a first bladder arranged within the first arm, a second bladder arranged within the second arm, and third bladder arranged within the center section.

The mechanism may include at least one electronically controlled electric motor configured to generate vibration relative to the vehicle seat occupant's neck.

The electric motor(s) may include a first motor arranged within the first arm, a second motor arranged within the second arm, and third motor arranged within the center section.

A vehicle seat assembly having the disclosed head restraint assembly is also provided.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
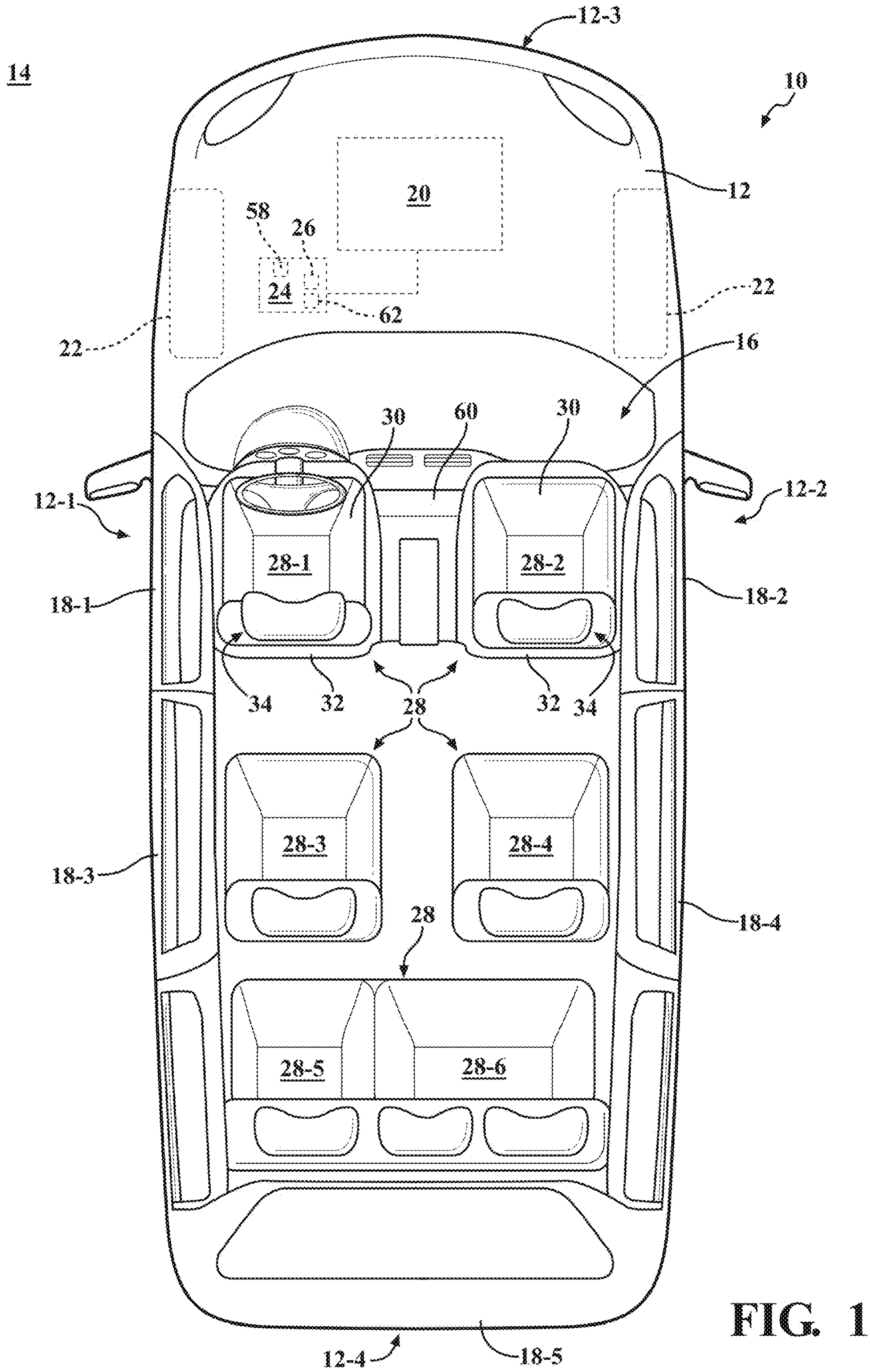
FIG. 1 is a schematic top view of a representative vehicle having a vehicle cabin with seat assemblies for vehicle occupants and illustrating the seat assemblies with head restraint assemblies, according to the present disclosure.

Embodiments of the present disclosure as described herein are intended to serve as examples. Other embodiments may take various and alternative forms. Additionally, the drawings are generally schematic and not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

Certain terminology may be used in the following description for the purpose of reference only, and thus are not intended to be limiting. For example, terms such as "above" and "below" refer to directions in the drawings to which reference is made. Terms such as "front", "back", "fore", "aft", "left", "right", "rear", "side", "upward", "downward", "top", and "bottom", etc., describe the orientation and/or location of portions of the components or elements within a consistent but arbitrary frame of reference, which is made clear by reference to the text and the associated drawings describing the components or elements under discussion.

Furthermore, terms such as "first", "second", "third", and so on may be used to describe separate components. Such terminology may include the words specifically mentioned above, derivatives thereof, and words of similar import, and are used descriptively for the figures, and do not represent limitations on the scope of the disclosure, as defined by the appended claims. Moreover, the teachings may be described herein in terms of functional and/or logical block components and/or various processing steps. It should be realized that such block components may include a number of hardware, software, and/or firmware components configured to perform the specified functions.

Referring to the drawings, wherein like reference numbers refer to like components throughout the several views, FIG. 1 schematically depicts a vehicle 10. The vehicle 10 is generally characterized by a vehicle body 12 surrounded by an external environment 14. The vehicle body 12 defines a vehicle interior or cabin 16 configured to accommodate a vehicle operator and passenger(s), for example in a generally seated position. The vehicle body 12 includes a left-side section 12-1, a right-side section 12-2, a front-end section 12-3, and a rear-end section 12-4. The vehicle body 12 may also include a plurality of side doors, such as left-front door 18-1, right-front door 18-2, left-rear door 18-3, and right-rear door 18-4, and a tailgate 18-5 (at the rear-end section 12-4) for gaining access to the vehicle cabin 16.

The vehicle 10 also includes a powerplant 20 configured to generate an output torque for powering the vehicle. The powerplant 20 may include an internal combustion engine, electric motor(s), and/or a fuel cell configured to propel the vehicle, such as via driven wheels 22. The vehicle 10 also includes an electronic controller 24 (shown in FIGS. 1 and 2). The electronic controller 24 may be a central processing unit (CPU) or a body control module (BCM) configured to receive data signals from various vehicle sensors and regulate operation of vehicle systems. The electronic controller 24 may be in operative communication with such vehicle systems and sensors via a data network, e.g., a Controller Area Network (CAN bus), arranged in the vehicle 10.

The electronic controller 24 includes a memory that is tangible and non-transitory. The memory may be a recordable medium that participates in providing computer-readable data or process instructions. Such a medium may take many forms, including but not limited to non-volatile media and volatile media. Non-volatile media used by the electronic controller 24 may include, for example, optical or magnetic disks and other persistent memory. Volatile media of each of the controller's memory may include, for example, dynamic random-access memory (DRAM), which may constitute a main memory. Such instructions may be transmitted by one or more transmission medium, including coaxial cables, copper wire and fiber optics, including the wires that comprise a system bus coupled to the vehicle systems.

Memory of the electronic controller 24 may also include a flexible disk, hard disk, magnetic tape, other magnetic medium, a CD-ROM, DVD, other optical medium, etc. The electronic controller 24 may be equipped with a high-speed primary clock, requisite Analog-to-Digital (A/D) and/or Digital-to-Analog (D/A) circuitry, input/output circuitry and devices (I/O), as well as appropriate signal conditioning and/or buffer circuitry. Algorithms required by the electronic controller 24 or accessible thereby, generally indicated via numeral 26, may be stored in the memory and automatically executed to provide the required functionality.

Figure 2:
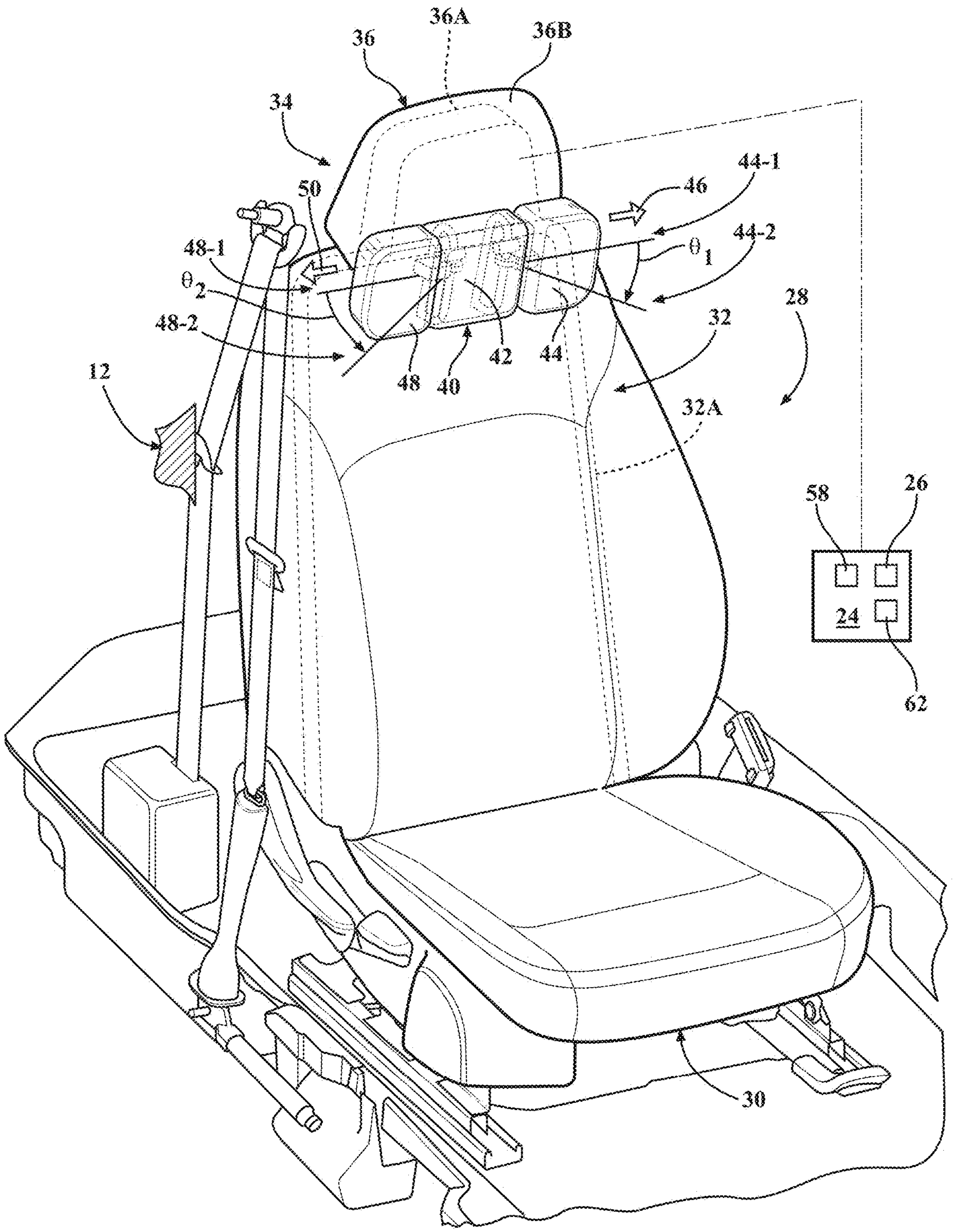
FIG. 2 is a schematic close-up perspective view of a representative seat assembly with the head restraint assembly shown in FIG. 1, illustrating an integrated adjustable neck support for a seat occupant, configured to shift together with the headrest and having first and second arms rotatably mounted to a center section, and specifically depicting the first and second wings in an unfolded position, according to the present disclosure.

As further shown in FIG. 1, the vehicle 10 may also include one or more vehicle seats or seat assemblies 28, such as a front left-side seat 28-1, a front right-side seat 28-2, rear left-side seat 28-3, and a rear right-side seat 28-4 arranged inside the cabin 16. The vehicle 10 may additionally include seat assemblies 28 in additional rows for carrying more passengers (such as seats 28-5 and 28-6), as shown. Such seat assemblies 28 may recline and/or be positionally adjustable relative to the vehicle body 12 for use by respective vehicle's occupants, such as the driver or passenger. As shown, each seat assembly 28 includes a seat cushion 30, a backrest 32, and a head restraint assembly 34. As shown in FIG. 2, the backrest 32 has a backrest frame 32A providing structure therefor.

Figure 4:
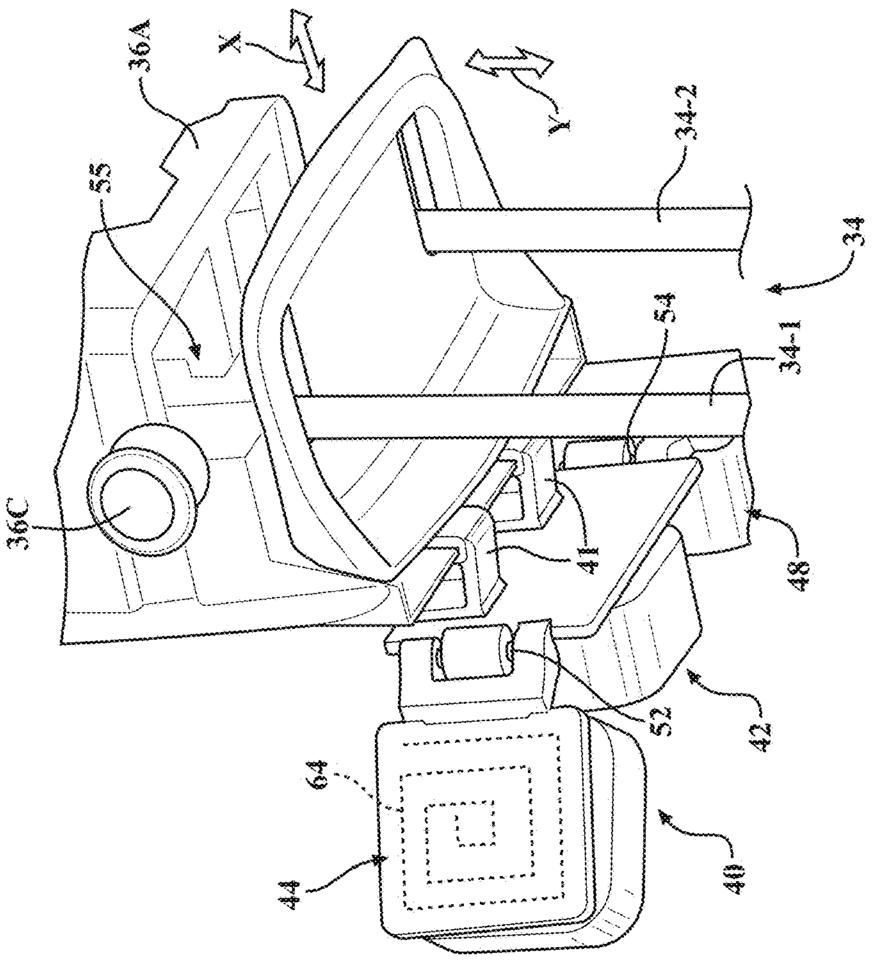
FIG. 4 is a schematic close-up second perspective partial view of the head restraint assembly with the adjustable neck support shown in FIG. 2 integrally mounted to a headrest frame, illustrating a built-in heating element for a heating function regulated by an electronic controller, according to the present disclosure.

With continued reference to FIG. 2, the head restraint assembly 34 includes a headrest 36 including a headrest frame 36A supporting a pillow section 36B constructed from yielding material, such as foam, for contact with the occupant's head. The headrest 36 is moveably mounted to the backrest 32 and configured to limit rearward movement of a head relative to the vehicle seat occupant's torso. The headrest 36 may be configured to move toward/away from the backrest 32, e.g., actuated via a push button 36C (shown in FIG. 3), permitting a height (up/down) adjustment Y (shown in FIG. 4) of the head restraint assembly 34 independently of the backrest. For example, the head restraint assembly 34 may employ one or more shafts or posts 34-1, 34-2 (shown in FIG. 3) configured to permit the head restraint assembly to be manually shifted or motored relative to the backrest frame 32A. Additionally, the headrest 36 may include a fore/aft adjustment X (shown in FIG. 4) relative to the backrest 32, such as via the push button 36C or a similar device, to bring the pillow section 36B closer to or shift the pillow section away from the occupant's head.

Figure 5:
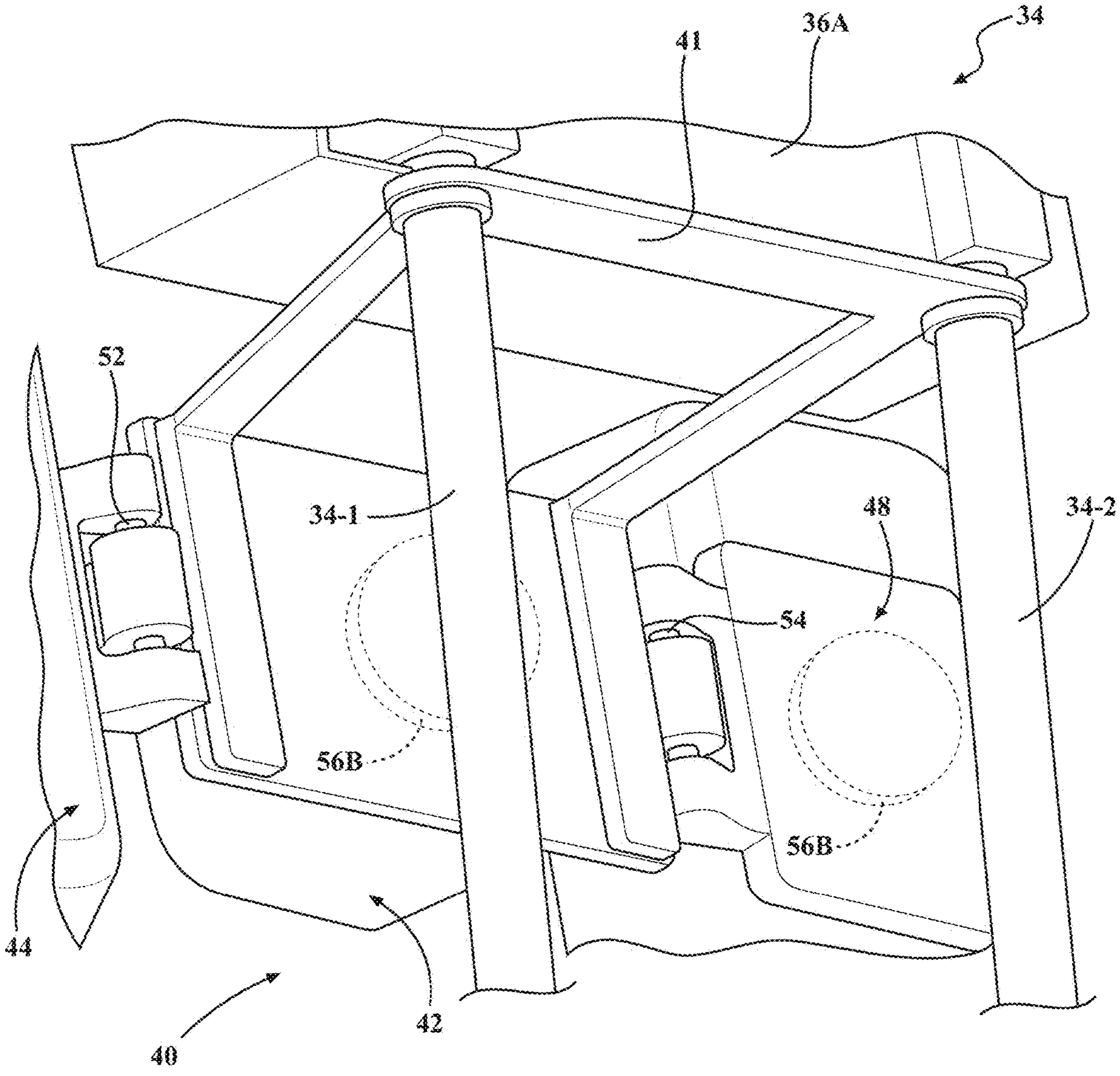
FIG. 5 is a schematic close-up second perspective partial view of the head restraint assembly with the adjustable neck support shown in FIG. 2 integrally mounted to headrest posts, according to the present disclosure.

As shown in FIG. 2, the head restraint assembly 34 also includes a neck support 40 fixedly and integrally mounted to the headrest 36, such as to the headrest frame 36A (shown in FIGS. 3 and 4) and/or to the posts 34-1, 34-2 (shown in FIG. 5), such as via appropriate bracket(s) 41. The neck support 40 is configured to brace the vehicle seat occupant's neck and shift together, e.g., up/down and fore/aft, with the headrest 36 relative to the backrest 32. The neck support 40 may include a center section 42 mounted to the headrest frame 36A. The neck support 40 may also include a first arm 44 rotatably mounted to the center section 42 and be thereby provided to adjust its angle $\theta_1$ relative to the center section between an unfolded or flat position 44-1 and a folded or angled position 44-2 (each shown in FIG. 2) to support the vehicle seat occupant's neck in a first lateral direction 46. The neck support 40 may also include a second arm 48 rotatably mounted to the center section 42 and be thereby provided to adjust its angle $\theta_2$ between an unfolded position 48-1 and a folded position 48-2 (each shown in FIG. 2) relative to the center section 42 to support the vehicle seat occupant's neck in a second lateral direction 50. Each of the first and second arms 44, 48 may rotate independently relative to the center section 42. Each arm 44, 48 may be covered in a yielding or soft material and include a respective arm frame serving as the corresponding arm's rigid structure.

Figure 3:
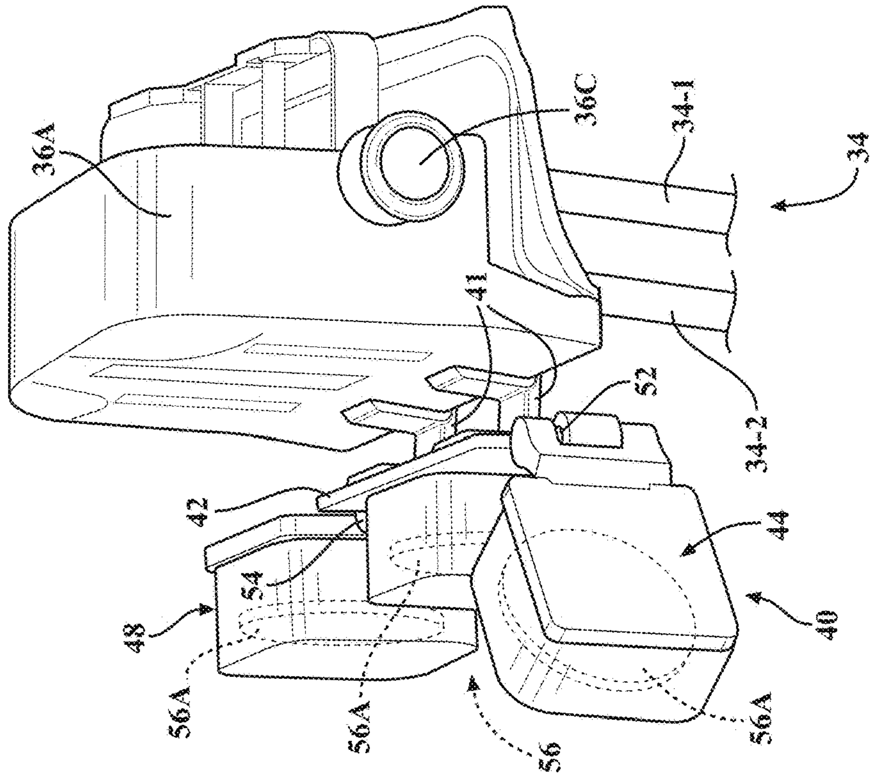
FIG. 3 is a schematic close-up first perspective partial view of the head restraint assembly with integrated adjustable neck support shown in FIG. 2, illustrating a built-in massage mechanism regulated by an electronic controller, according to the present disclosure.

As shown in FIG. 3, head restraint assembly 34 may additionally include a first hinge pin 52 extending through each of the center section 42 and the first arm 44 and fixed to the first arm while able to rotate relative to the center section. The head restraint assembly 34 may further include a second hinge pin 54 (shown in FIG. 3), extending through each of the center section 42 and the second arm 48 and fixed to the second arm and able to rotate relative to the center section. Each of the first and second hinge pins 52, 54 may be splined into their respective first and second arms 44, 48 to affect a fixed engagement therewith. Each of the first and second hinge pins 52, 54 may be further configured to generate sliding, light interference, or other frictional engagement with the center section 42 to thereby affect controlled adjustment of the respective first and second arms. Alternatively, each of the interfaces between the first and second arms 44, 48 may include a ratcheting mechanism 55 actuated by a push button or knob (not shown) to affect positional adjustment of the respective arms relative to the center section 42.

As shown in FIG. 3, the neck support 40 may also include a mechanism 56 configured to generate a massage of the vehicle seat occupant's neck. The massage mechanism 56 may include one or more electronically controlled inflatable fluid bladders 56A configured to generate a pulsating motion relative to the vehicle seat occupant's neck. Specifically, an individual fluid bladder 56A may be arranged within each of the corresponding center section 42, first arm 44, and second arm 48. Alternatively, the massage mechanism 56 may include one or more electronically controlled electric motors 56B (shown in FIG. 5) configured to generate vibration relative to the vehicle seat occupant's neck. Specifically, an individual electric motor 56B may be arranged within each of the corresponding center section 42, first arm 44, and second arm 48. The electronic controller 24 may be programmed with a specific algorithm 26 to control the massage mechanism 56 with massage parameters 58, such as the amount of time, speed, intensity, and/or massage type or pattern of the pulsating motion or vibration (such as kneading, pressing, rolling, and more). Operator actuated buttons configured to trigger operation of the massage mechanism 56 and offering customizable settings may be arranged in the vehicle cabin 16, such as on the seat assembly 28, integrated into a control panel in a center stack, or as part of an infotainment touchscreen 60.

The neck support 40 may additionally include a heating function 62 programmed into the electronic controller 24 (shown in FIG. 2). The heating function may be affected by at least one heating element or pad 64 (shown in FIG. 4). For example, the heating element(s) 64 may be operated on the principle of electric resistance, with the heat being applied to the vehicle seat occupant's neck. The algorithm 26 may include operating steps for actuating and shutting off the heating element(s) 64, as well as for controlling the time and temperature of the heating function 62. Each heating element 64 may have an automatic, e.g., time based, shut-off feature. An individual heating element 64 may be arranged within each of the corresponding center section 42, first arm 44, and second arm 48. Similar to the massage mechanism 56, operator actuated buttons for triggering operation of the heating function may be arranged in the vehicle cabin 16, such as on the seat assembly 28, integrated into a control panel in a center stack, or as part of an infotainment touchscreen 60.

Overall, the head restraint assembly 34 provides a vehicle seat assembly with a headrest having an integrated or built-in neck support configured to shift along with the headrest for ergonomically effective bracing of the occupant's neck and head. The neck support may provide selectable bracing for the vehicle seat occupant's neck in lateral directions and permit customized support using individually hinged arms. The neck support may also incorporate massage and heating functions to enhance user comfort with controls incorporated either into the corresponding seat assembly or into the host vehicle's infotainment system.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A head restraint assembly for a vehicle seat having a seat cushion and backrest, the head restraint assembly comprising:

a headrest configured to be moveably mounted to the backrest and configured to limit rearward movement of a head relative to a torso of a vehicle seat occupant; and a neck support fixedly and integrally mounted to the headrest and configured to brace a neck of the vehicle seat occupant and shift together with the headrest relative to the backrest; wherein the neck support includes:

a center section mounted to the headrest;

a first arm rotatably mounted to the center section and thereby provided to adjust an angle of the first arm between an unfolded position and a folded position relative to the center section and support the vehicle seat occupant's neck in a first lateral direction;

a second arm rotatably mounted to the center section and thereby provided to adjust an angle of the second arm between an unfolded position and a folded position relative to the center section and support the vehicle seat occupant's neck in a second lateral direction;

a first hinge pin extending through each of the center section and the first arm and fixed to the first arm; and a second hinge pin extending through each of the center section and the second arm and fixed to the second arm.

2. The head restraint assembly of claim 1, wherein the headrest is configured to moveably adjust toward/away and fore/aft relative to the backrest.

3. The head restraint assembly of claim 1, wherein the first arm and the second arm rotate independently relative to the center section.

4. The head restraint assembly of claim 1, wherein:

the headrest includes a headrest frame; and the center section is mounted to the headrest frame.

5. The head restraint assembly of claim 1, wherein each of the first and second hinge pins is configured to generate friction relative to the center section and thereby affect adjustment of the respective first and second arms.

6. The head restraint assembly of claim 1, wherein the neck support includes a mechanism configured to generate a massage of the vehicle seat occupant's neck.

7. The head restraint assembly of claim 6, wherein the mechanism includes at least one electronically controlled fluid bladder configured to generate a pulsating motion relative to the vehicle seat occupant's neck.

8. The head restraint assembly of claim 6, wherein the mechanism includes at least one electronically controlled electric motor configured to generate vibration relative to the vehicle seat occupant's neck.

9. A vehicle seat assembly comprising:

a seat cushion;

a backrest; and a head restraint assembly mounted to the backrest, wherein the head restraint assembly includes:

a headrest moveably mounted to the backrest and configured to limit rearward movement of a head relative to a torso of a vehicle seat occupant; and a neck support fixedly and integrally mounted to the headrest and configured to brace a neck of the vehicle seat occupant and shift together with the headrest relative to the backrest; wherein the neck support includes:

a center section mounted to the headrest;

a first arm rotatably mounted to the center section and thereby provided to adjust an angle of the first arm between an unfolded position and a folded position relative to the center section and support the vehicle seat occupant's neck in a first lateral direction;

a second arm rotatably mounted to the center section and thereby provided to adjust an angle of the second arm between an unfolded position and a folded position relative to the center section and support the vehicle seat occupant's neck in a second lateral direction;

a first hinge pin extending through each of the center section and the first arm and fixed to the first arm; and a second hinge pin extending through each of the center section and the second arm and fixed to the second arm.

10. The vehicle seat assembly of claim 9, wherein the headrest is configured to moveably adjust toward/away and fore/aft relative to the backrest.

11. The vehicle seat assembly of claim 9, wherein the first arm and the second arm rotate independently relative to the center section.

12. The vehicle seat assembly of claim 9, wherein:

the headrest includes a headrest frame; and the center section is mounted to the headrest frame.

13. The vehicle seat assembly of claim 9, wherein each of the first and second hinge pins is configured to generate friction relative to the center section and thereby affect adjustment of the respective first and second arms.

14. The vehicle seat assembly of claim 9, wherein the neck support includes a mechanism configured to generate a massage of the vehicle seat occupant's neck.

15. The vehicle seat assembly of claim 14, wherein the mechanism includes:

at least one electronically controlled fluid bladder configured to generate a pulsating motion relative to the vehicle seat occupant's neck; or at least one electronically controlled electric motor configured to generate vibration relative to the vehicle seat occupant's neck.

16. A head restraint assembly for a vehicle seat having a seat cushion and backrest, the head restraint assembly comprising:

a headrest configured to be moveably mounted to the backrest and configured to moveably adjust toward/away and fore/aft relative to the backrest and limit rearward movement of a head relative to a torso of a vehicle seat occupant; and a neck support fixedly and integrally mounted to the headrest and configured to brace a neck of the vehicle seat occupant and shift together with the headrest relative to the backrest, wherein the neck support includes:

a center section mounted to the headrest;

a first arm rotatably mounted to the center section and thereby provided to adjust an angle of the first arm between an unfolded position and a folded position relative to the center section and support the vehicle seat occupant's neck in a first lateral direction;

a second arm rotatably mounted to the center section and thereby provided to adjust an angle of the second arm between an unfolded position and a folded position relative to the center section and support the vehicle seat occupant's neck in a second lateral direction;

a first hinge pin extending through each of the center section and the first arm and fixed to the first arm;

a second hinge pin extending through each of the center section and the second arm and fixed to the second arm; and a mechanism configured to generate a massage of the vehicle seat occupant's neck.

* * * * *